(12) United States Patent
Chen

(10) Patent No.: US 8,196,994 B2
(45) Date of Patent: Jun. 12, 2012

(54) ROTATIONALLY SUPPORTING STRUCTURE OF VEHICLE'S DRAG-REDUCING APPARATUS

(75) Inventor: Shih-Hsiung Chen, Yongkang (TW)

(73) Assignee: Thermaflow Energy Technology, Inc., Tainan County (TW)

( * ) Notice: Subject to any disclaimer, the term of this patent is extended or adjusted under 35 U.S.C. 154(b) by 327 days.

(21) Appl. No.: 12/605,588

(22) Filed: Oct. 26, 2009

(65) Prior Publication Data

US 2011/0095565 A1 Apr. 28, 2011

(51) Int. Cl.
*B62D 35/00* (2006.01)
(52) U.S. Cl. .................... 296/180.4; 180/903
(58) Field of Classification Search ............. 105/1.1, 105/1.2, 1.3; 180/903; 296/180.1, 180.2, 296/180.3, 180.4, 180.5
See application file for complete search history.

(56) References Cited

U.S. PATENT DOCUMENTS

| | | | | | |
|---|---|---|---|---|---|
| 3,960,402 | A | * | 6/1976 | Keck | 296/180.4 |
| 4,309,053 | A | * | 1/1982 | Lett | 296/180.4 |
| 4,316,630 | A | * | 2/1982 | Evans | 296/180.2 |
| 4,320,920 | A | * | 3/1982 | Goudey | 296/180.4 |
| 4,451,074 | A | * | 5/1984 | Scanlon | 296/180.4 |
| 4,674,788 | A | * | 6/1987 | Ohmura et al. | 296/180.5 |
| 4,818,015 | A | * | 4/1989 | Scanlon | 296/180.1 |
| 5,058,945 | A | * | 10/1991 | Elliott et al. | 296/180.5 |
| 5,199,762 | A | * | 4/1993 | Scheele et al. | 296/180.1 |
| 5,280,990 | A | * | 1/1994 | Rinard | 296/180.1 |
| 5,487,586 | A | * | 1/1996 | Kinkaide | 296/180.1 |
| 6,402,228 | B1 | * | 6/2002 | Chaffin | 296/180.4 |
| 6,666,498 | B1 | * | 12/2003 | Whitten | 296/180.4 |
| 6,669,270 | B1 | * | 12/2003 | Card et al. | 296/180.1 |
| 6,854,788 | B1 | * | 2/2005 | Graham | 296/180.4 |
| 7,192,077 | B1 | * | 3/2007 | Hilleman | 296/180.1 |
| 7,240,958 | B2 | * | 7/2007 | Skopic | 296/180.1 |
| 7,484,791 | B1 | * | 2/2009 | Chen | 296/180.5 |
| 7,537,270 | B2 | * | 5/2009 | O'Grady | 296/180.4 |
| 7,641,262 | B2 | * | 1/2010 | Nusbaum | 296/180.5 |
| 7,765,044 | B2 | * | 7/2010 | Neuburger et al. | 701/36 |
| 7,862,102 | B1 | * | 1/2011 | Benton | 296/180.1 |
| 7,950,720 | B2 | * | 5/2011 | Skopic | 296/180.1 |
| 2008/0309122 | A1 | * | 12/2008 | Smith et al. | 296/180.1 |
| 2011/0115254 | A1 | * | 5/2011 | Skopic | 296/180.3 |
| 2011/0221231 | A1 | * | 9/2011 | Visser et al. | 296/180.4 |

FOREIGN PATENT DOCUMENTS

| | | | |
|---|---|---|---|
| DE | 4014577 C1 | * | 10/1991 |
| DE | 4237458 A1 | * | 5/1994 |
| JP | 60146747 A | * | 8/1985 |
| JP | 62055279 A | * | 3/1987 |
| JP | 06016157 A | * | 1/1994 |

* cited by examiner

*Primary Examiner* — Glenn Dayoan
*Assistant Examiner* — Paul Chenevert
(74) *Attorney, Agent, or Firm* — Chun-Ming Shih; HDLS IPR Services

(57) ABSTRACT

A vehicle's drag-reducing apparatus, adapted to be arranged at the tail end of a vehicle, includes a diversion body positioned at the lateral surface of the vehicle and a rotary piece. The airflow flowing across the lateral surface of the vehicle body is guided to the tail end of the vehicle by the diversion body. One end of the rotary piece is pivoted to the vehicle body, while another end is fixed to the diversion body. Rotating the rotary piece will bring along the diversion body to be abutted against the tail end of the vehicle body or to be moved to the position far away from the tail end of the vehicle body. Thereby, the opening of the rear door at the tail end of the vehicle won't be hindered, even where there is an arrangement of the diversion body.

12 Claims, 5 Drawing Sheets

ROTATIONALLY SUPPORTING STRUCTURE OF VEHICLE'S DRAG-REDUCING APPARATUS

BACKGROUND OF THE INVENTION

1. Field of the Invention

The present invention in general relates to airflow diversion structures, in particular, to an airflow diversion structure capable of reducing the drag of a running vehicle.

2. Description of Prior Art

When a vehicle is running in high speed, in order to reduce the unnecessary fuel consumption and the drag generated from the influence of the airflow, a commonly adapted solution is to install an airflow deflector on top of the vehicle. Through guiding the airflow by the deflector, the drag and the fuel consumption are reduced. According to prior arts, the deflector is installed at the tail end of the top of a vehicle, in particular, a large vehicle, such as a tractor trailer. When the vehicle is driven on the road, the flowing angle of the airflow formed at the windward sides can be changed, such that the drag generated from the running of the vehicle can be reduced.

Although the deflector can reduce the influence caused by the airflow flowing at front and back of the vehicle body, there is still a large magnitude of drag caused by the airflow flowing across the side lateral surfaces of the vehicle body, when the car is running. Accordingly, a long deflector is additionally installed at the tail end of the lateral surface of the vehicle body. By vertically arranging the deflector at the tail end of the lateral surface of the vehicle body, the direction of the airflow passing through the deflector can be changed. When the lateral airflow is guided to the back of the vehicle, the formation of the drag can be thereby reduced. However, when the vehicle is stopped, the deflector vertically arranged at the tail end of the lateral surface of the vehicle body becomes a hindrance for opening the rear door. Therefore, the deflector has to be dismantled before opening the rear door, which causes a lot of inconvenience in terms of usage.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve the aforementioned problems, the invention is mainly to provide a rotationally supporting structure of a vehicle's drag-reducing apparatus, in which the diversion body can be moved to a side far away from the tail end of the vehicle by rotating the rotary piece, such that the hindrance for opening the rear door at the tail end of the vehicle can be avoided, even when there is an arrangement of the diversion body.

Secondly, the invention is to provide a rotationally supporting structure of a vehicle's drag-reducing apparatus, adapted by being arranged at the tail end of a vehicle, including a diversion body positioned at the lateral surface of the vehicle and a rotary piece. The airflow flowing across the lateral surface of the vehicle body is guided to the tail end of the vehicle by the diversion body. One end of the rotary piece is pivoted to the vehicle body, while another end is fixed to the diversion body. Rotating the rotary piece will bring along the diversion body to be abutted against the tail end of the vehicle body or to be moved to a side far away from the tail end of the vehicle body.

Compared with prior arts, the invention further possesses the following functions and merits. First of all, a rotationally supporting structure of a vehicle's drag-reducing apparatus according to the present invention is to vertically arrange a deflector at the tail end of the lateral surface of the vehicle body, such that the direction of the airflow flowing through the deflector is changed and the airflow is guided to the back of the vehicle body, whereby a formation of drag is thus reduced. Secondly, the deflector arranged at the tail end of the vehicle body can be rotated 180 degrees by a rotary piece to a side far away from the tail end of the vehicle, whereby the hindrance for opening the rear door at the tail end of the vehicle body can be avoided, which really enhances the practicability and convenience of the invention.

BRIEF DESCRIPTION OF DRAWING

The features of the invention believed to be novel are set forth with particularity in the appended claims. The invention itself, however, may be best understood by reference to the following detailed description, which describes an embodiment of the invention, taken in conjunction with the accompanying drawings, in which:

DETAILED DESCRIPTION OF THE INVENTION

In cooperation with attached drawings, the technical contents and detailed description of the present invention are described thereinafter according to an embodiment, not used to limit its executing scope. Any equivalent variation and modification made according to appended claims is all covered by the claims claimed by the present invention.

Figure 1:
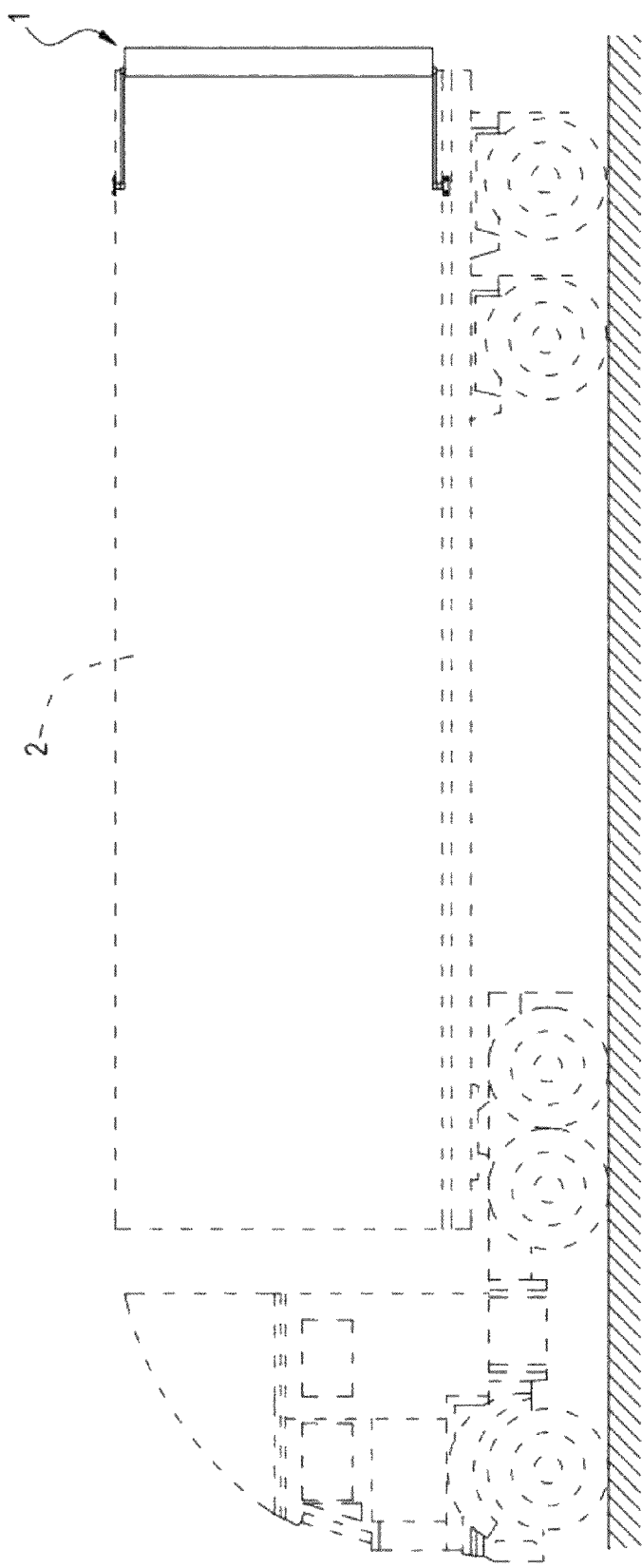
FIG. 1 is a plane illustration of the invention arranged to a vehicle body.
Figure 2:
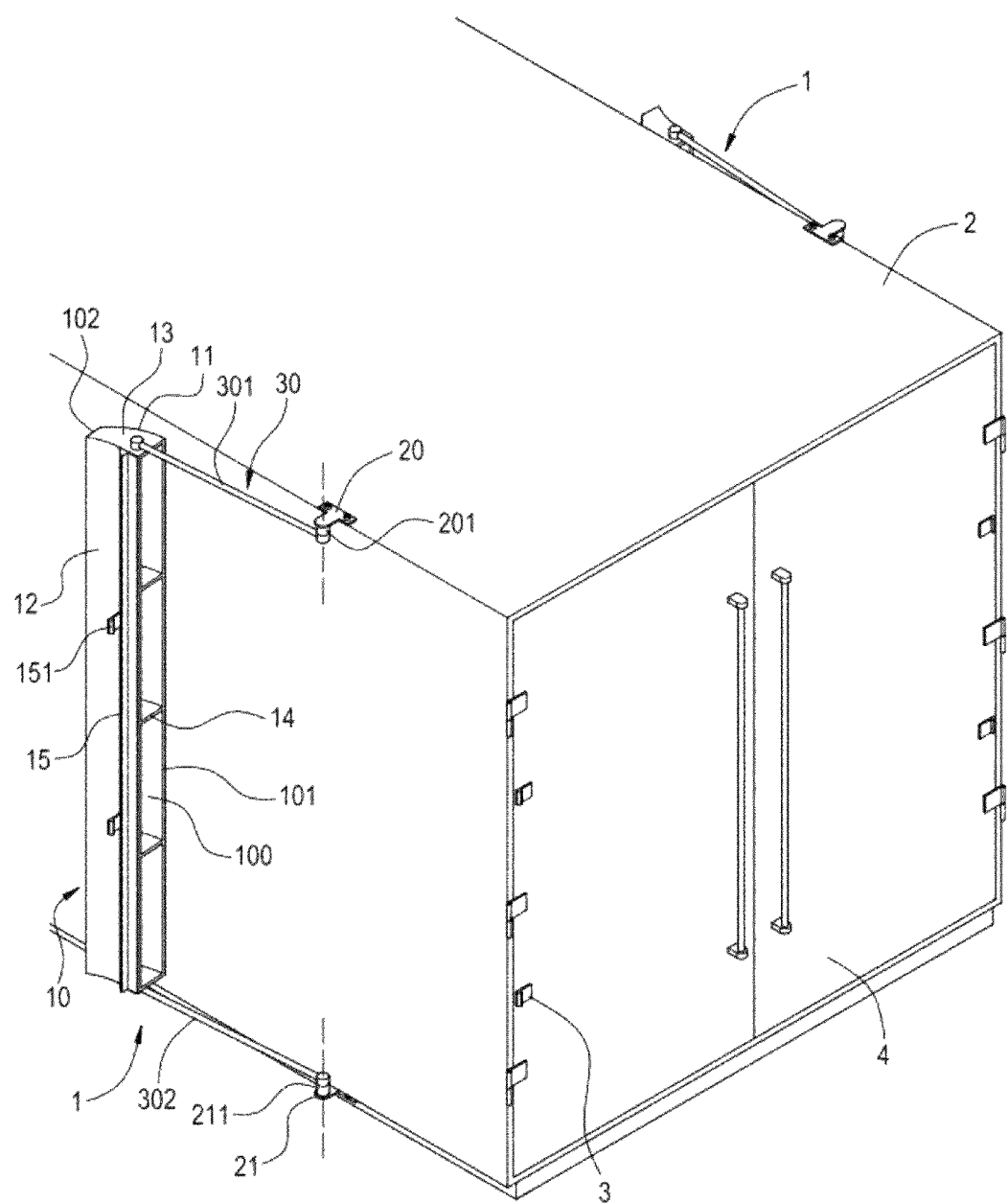
FIG. 2 is a perspective partial view of the invention arranged to a vehicle body.

Please refer to FIG. 1 and FIG. 2, which are two illustrations respectively showing a vehicle's drag-reducing apparatus arranged at the vehicle body. The vehicle's drag-reducing apparatus 1 according to the present invention is arranged at two lateral surfaces of a vehicle body 2 and includes a diversion body 10 and a rotary piece 30.

In this embodiment, the diversion body 10 is a long frame body positioned at a lateral surface of the vehicle body 2. The frame body is comprised of an outer deflector 11, an inner deflector 12 disposed by corresponding to the outer deflector 11 and two lateral deflectors 13 connecting the outer deflector 11 and the inner deflector 12. An airflow channel 100 is formed among the deflectors 11, 12, 13. Communicated to each other, an air inlet 101 and an air outlet 102 are respectively formed at two sides of the frame body. The outer deflector 11 and the inner deflector 12 are respectively configured as a piece of arc body. A plurality of supporting plates 14, which are further arranged in the frame body, are disposed in parallel to the lateral deflectors 13 and interspaced to each other by being accommodated in the airflow channel 100.

Moreover, a fixed seat body 15 is further combined to the inside of the diversion body 10 and arranged a plurality of fasteners 151 thereon. The fixed seat body 15 is a long triangular seat body constituted by rubber. However, not limited to a frame body only, the diversion body 10 can also be a single long piece body same as the outer deflector 11 or inner deflector 12 in the aforementioned structure, all of which can achieve a function of reducing drag. Nonetheless, the diversion body 10 is preferably a frame body, which has a better effect of drag reduction than a single piece body does.

In this embodiment, the rotary piece 30 is configured as a pair of links 301, 302, which are locked by a pair of locking assemblies 20, 21. Configured as a "T"-shaped plate body, each locking assemblies 20, 21 is respectively locked in parallel to the top side and the bottom side of the lateral surface of the vehicle body 2, by means of a plurality of screwing elements. In the meantime, the locking assemblies 20, 21 are respectively arranged a pivot 201, 211, the axial directions of both of which are all vertical to the top surface of the vehicle body 2.

By means of this pair of links 301, 302, the diversion body 10 is movably combined to the vehicle body 2. More specifically, one side of the link 301 is pivoted to the pivot 201 of the locking assembly 20, while another side is fixed to the lateral deflector 13 of the diversion body 10. Similarly, another link 302 is pivoted to the pivot 211 of another locking assembly 21. When taking the pivots 201, 211 as a rotational center respectively, this pair of links 301, 302 can be rotated an angle between 0 and 180 degrees. Brought along by the links 301, 302, the diversion body 10 can be rotated to be abutted against the tail end of the vehicle body 2 or to be moved to one side far away the tail end of the vehicle body 2.

Figure 3:
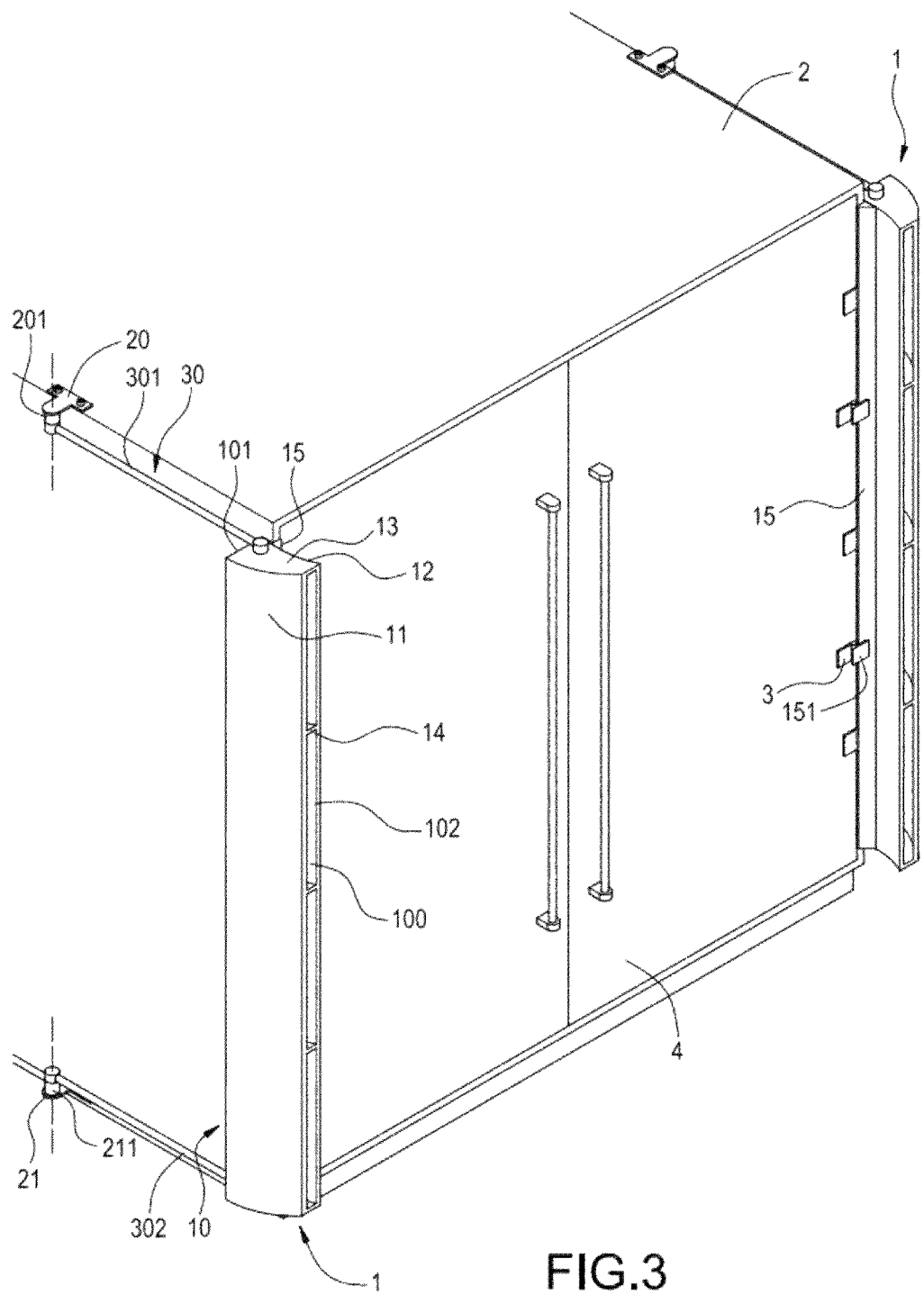
FIG. 3 is an illustration showing that the diversion body of the invention is rotated to the tail end of the vehicle body.
Figure 4:
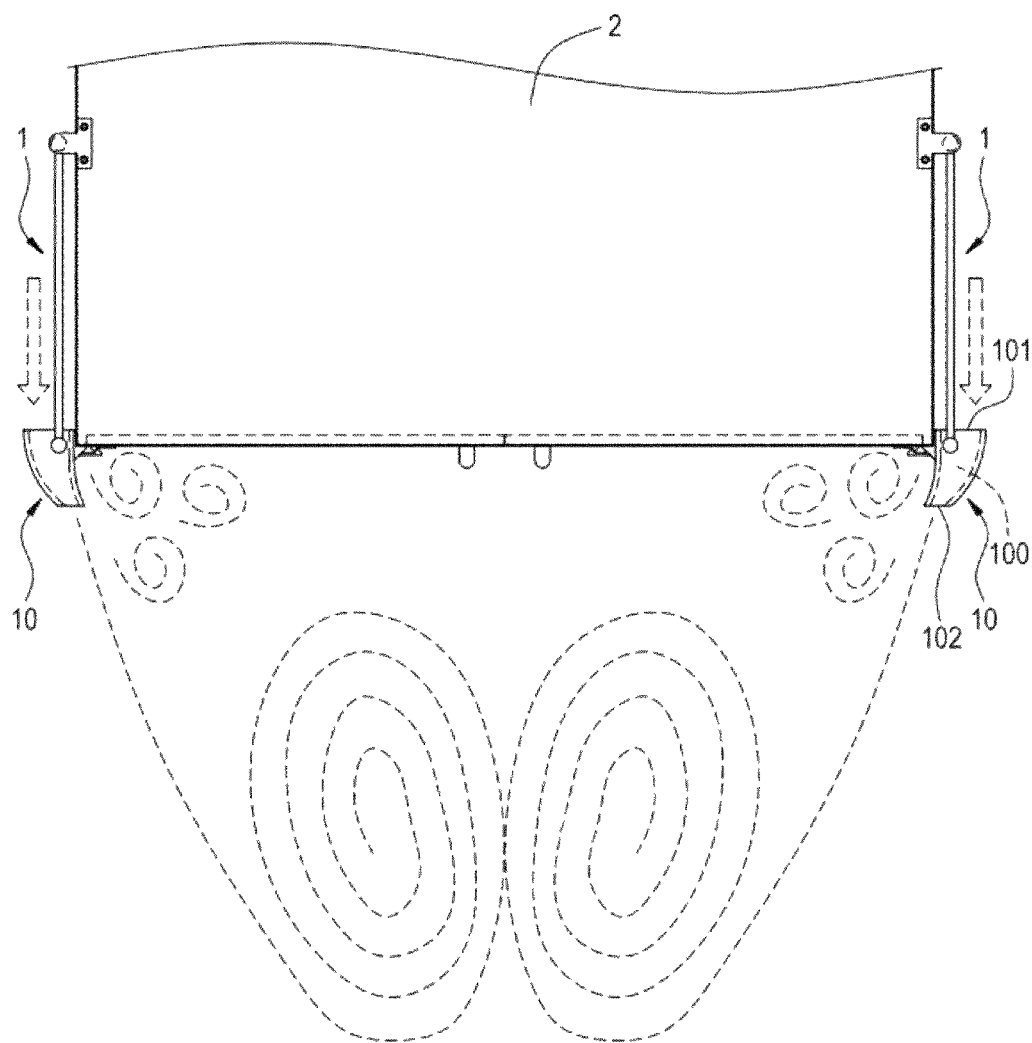
FIG. 4 is a plane illustration showing the flowing pattern of the airflow according to the present invention.

Please refer to FIG. 3 and FIG. 4, which respectively are a perspective illustration showing that the division body of the vehicle's drag-reducing apparatus of the invention has been rotated to the tail end of the vehicle body and a plane illustration showing the flowing pattern of the airflow of the invention. As seen in FIG. 3, another fastener 3 is arranged at the tail end of the vehicle body 2 corresponding to the fastener 151 of the fixed seat body 15 so, when the diversion body 10 is moved to the tail end of the vehicle body 2, these two fasteners 3, 151 can be buckled together, whereby the diversion body 10 is tightly fixed to the tail end of the vehicle body 2. Please further refer to FIG. 4, when the vehicle is running, the airflow flowing across the lateral surface of the vehicle body 2 enters the diversion body 10 from the air inlet 101. Following the guiding direction of the airflow channel 100 in the frame body, the airflow flows through the diversion body 10. When the airflow flows out of the diversion body 10 positioned at the tail end of the vehicle body 2, an invisible air wall is formed behind the vehicle body 2, which can reduce the size of the eddy zone behind the vehicle body 2 and make the airflow flow more smoothly, such that the influence of the drag caused by the airflow can be lowered down.

Figure 5:
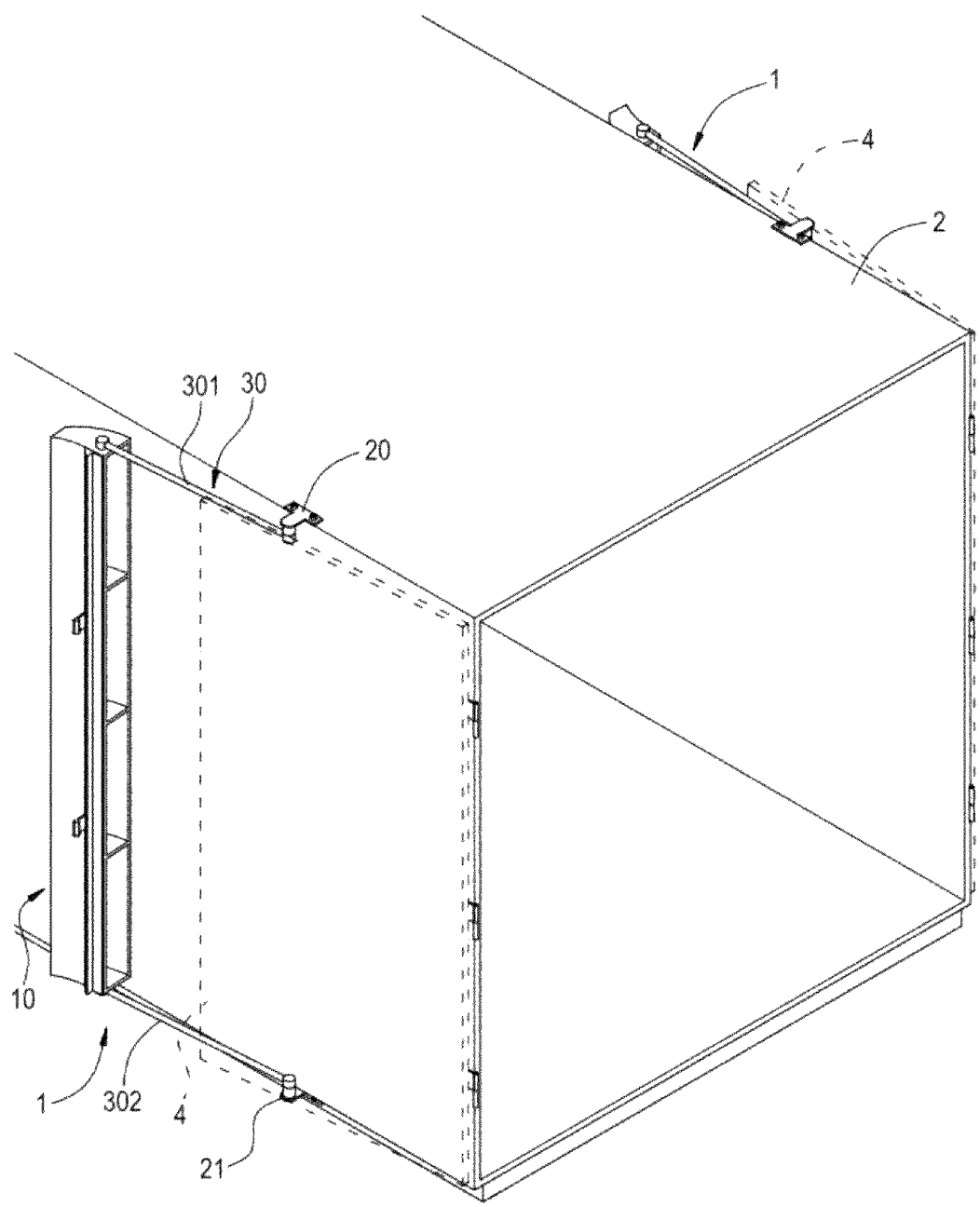
FIG. 5 is a usage illustration according to the present invention.

Please refer to FIG. 5 continuously, which is a usage illustration of the invention. When intending to open the rear door 4 at the tail end of the vehicle body 2, the inter-buckled fasteners 3, 151 are unlocked first. Next, the two lateral diversion bodies 10 are rotated an angle of 180 degrees by the pair of links 301, 302. After the two diversion bodies 10 are respectively moved to one side far away from the tail end of the vehicle body 2, the rear door 4 can be rotated an angle about 270 degrees to show an opened status.

Accordingly, through the constitution of aforementioned assemblies, a rotationally supporting structure of vehicle's drag-reducing apparatus according to the invention is thus obtained.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A rotationally supporting structure of a vehicle's drag-reducing apparatus, adapted to be arranged at a tail end of a vehicle, comprising:
    a diversion body which is positioned at a lateral surface of the vehicle, and which guides an airflow flowing across the lateral surface of the vehicle to the tail end of the vehicle; and
    a rotary piece, one end of which is pivoted to the vehicle body, and another end of which is fixed to the diversion body, and by a rotation of which the diversion body will be brought along to be abutted against the tail end of the vehicle or to be moved to a side that has a spaced distance away from the tail end of the vehicle,
    wherein the diversion body further includes a fixed seat body and a plurality of fasteners arranged at the fixed seat body, and the fixed seat body is combined to an inside of the diversion body and, when the diversion body is stopped at the tail end of the vehicle, the fasteners are buckled onto the vehicle.

2. The rotationally supporting structure of vehicle's drag-reducing apparatus according to claim 1, wherein the diversion body is a long piece body.

3. The rotationally supporting structure of vehicle's drag-reducing apparatus according to claim 1, wherein the fixed seat body is comprised of a rubber material.

4. The rotationally supporting structure of vehicle's drag-reducing apparatus according to claim 1, wherein the rotary piece is a pair of links, one side of each of which is pivoted to the lateral surface of the vehicle and can be rotated, while another side is fixed to the diversion body.

5. The rotationally supporting structure of vehicle's drag-reducing apparatus according to claim 1, wherein the rotary piece can be rotated an angle within a range of 0-180 degrees.

6. The rotationally supporting structure of vehicle's drag-reducing apparatus according to claim 1, wherein the diversion body is configured as a long frame body which is comprised by a combination of a plurality of deflectors, and between two of which an airflow channel is formed, and at two sides of which an air inlet and an air outlet are formed by being communicated with the airflow channel.

7. The rotationally supporting structure of vehicle's drag-reducing apparatus according to claim 6, wherein the frame body includes an outer deflector, an inner deflector disposed by corresponding to the outer deflector and two lateral deflectors connecting the outer deflector and the inner deflector.

8. The rotationally supporting structure of vehicle's drag-reducing apparatus according to claim 7, wherein the outer deflector and the inner deflector are both configured as a piece of arc body.

9. The rotationally supporting structure of vehicle's drag-reducing apparatus according to claim 7, wherein the frame body further includes a plurality of separating plates which are disposed in parallel to the lateral deflectors and are inter-spaced to each other by being accommodated in the airflow channel.

10. The rotationally supporting structure of vehicle's drag-reducing apparatus according to claim 1, wherein the apparatus further includes a pair of locking assemblies which are locked onto the vehicle body in parallel to each other and each has a pivot, and an axial direction of the pivot is vertical to a top face of the vehicle.

11. The rotationally supporting structure of vehicle's drag-reducing apparatus according to claim 10, wherein the locking assembly is configured as a "T"-shaped plate body, which is locked onto the vehicle body by a plurality of screwing elements.

12. The rotationally supporting structure of vehicle's drag-reducing apparatus according to claim 10, wherein the pair of locking assemblies are respectively locked to a top side and a bottom side of the lateral surface of the vehicle.

* * * * *